March 11, 1969 H. D. KAUFFMAN 3,432,739
VOLTAGE REGULATOR FOR INDUCTION HEATING APPARATUS
Filed Sept. 2, 1966

INVENTOR.
HARRY D. KAUFFMAN
BY Marechal, Biebel, French & Bugg
ATTORNEYS

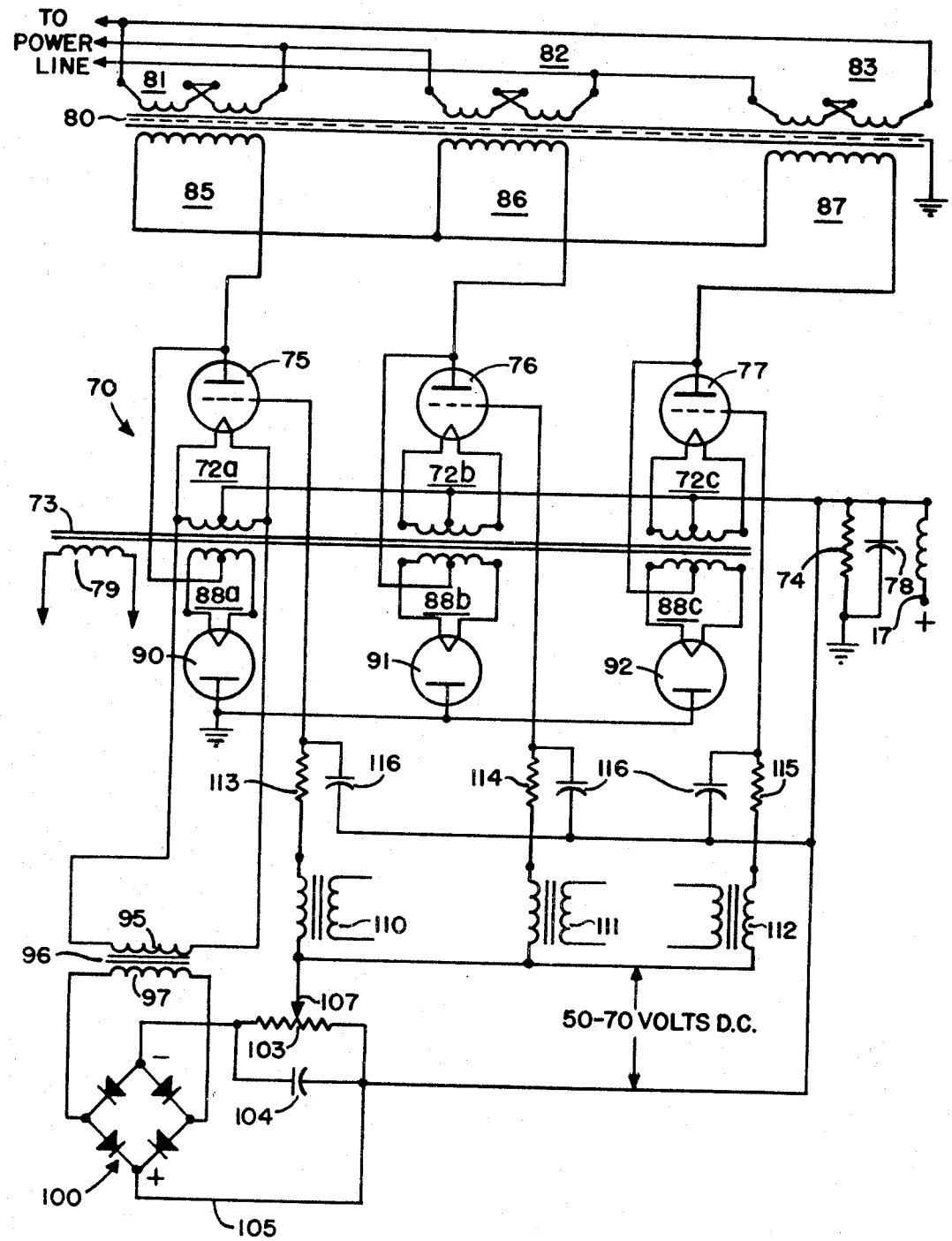

United States Patent Office 3,432,739
Patented Mar. 11, 1969

3,432,739
VOLTAGE REGULATOR FOR INDUCTION
HEATING APPARATUS
Harry D. Kauffman, Cincinnati, Ohio, assignor to The
Ohio Crankshaft Co., Cleveland, Ohio, a corporation
of Ohio
Filed Sept. 2, 1966, Ser. No. 577,077
U.S. Cl. 321—18                                    1 Claim
Int. Cl. H02m 7/20

ABSTRACT OF THE DISCLOSURE

A voltage regulated power supply for supplying a controlled input voltage to a load includes a rectifier circuit incorporating a saturable core reactor, the reactance of its primary winding controlling the voltage output from the rectifier circuit. A silicon controlled rectifier is placed in series with the control winding of the saturable core reactor, and a pulse generator is used to determine the time during which this silicon controlled rectifier remains in the conducting state in response to the difference between the actual voltage output of the rectifier circuit and a reference voltage.

---

Reference is hereby made to my copending application Ser. No. 463,737, filed June 14, 1965, now Patent No. 3,375,432.

This invention relates to a control circuit for controlling the voltage input to a radio frequency oscillator of the type used to supply power to an induction heating coil.

In the field of induction heating, it is necessary accurately to maintain constant the power through the coil which is used to induce currents in a metallic workpiece so that uniform heating of the workpiece and repeatability of the degree of heating between workpieces can be achieved. It has been found that the output of a high power radio frequency generator with an average output of 14,000 volts may vary, without regulation, as much as 1000 volts or 9 kva. This degree of variation of output power is intolerable in heat treating applications where the degree of hardness as well as the depth of hardness must be accurately controlled.

The control circuit of this invention is designed to maintain the output voltage of the power supply within ±1.5 percent with an input voltage variation of as much as ten percent. This may be accomplished in one form of the apparatus constructed according to this invention by using a silicon controlled rectifier in the control circuit of a saturable reactor placed in the high voltage power supply to the radio frequency oscillator circuit. The input voltage to the oscillator is measured, compared with a reference voltage, and used to control the pulse width, or the amount of time during which the silicon controlled rectifier is gated on. The current through the silicon controlled rectifier may then be used to vary the reactance of the saturable core reactor in the power supply circuit or the time during which a thyratron rectifier conducts. As a result, power supply output may be accurately maintained within very narrow limits thus assuring that the power output of the radio frequency oscillator is kept at a constant level and that the degree of heat treatment derived therefrom is repeatable.

Accordingly, it is an object of this invention to provide a voltage regulator system used in conjunction with a radio frequency oscillator of the type used in induction heating to maintain the output power of that oscillator substantially constant with wide variations in input line voltage.

It is another object of this invention to provide a control circuit used in the power supply to a radio frequency oscillator of the type used for induction heating which incorporates a silicon diode rectifier to control a reactance in the power supply circuit and consequently its output power.

It is another object of this invention to provide a regulating circuit for accurately controlling the output power of a high power radio frequency oscillator of the type used in induction heating which varies the duration of the time during which a thyratron rectifier conducts in accordance with the variation in oscillator input voltage.

These and other objects and advantages of the invention will be apparent from the following description, the accompanying drawings and the appended claims.

In the drawings—

FIG. 4 is a schematic diagram of a thyratron rectifier circuit wherein the output power can be altered by changing the phase angle of the grid voltage;

Figure 1:
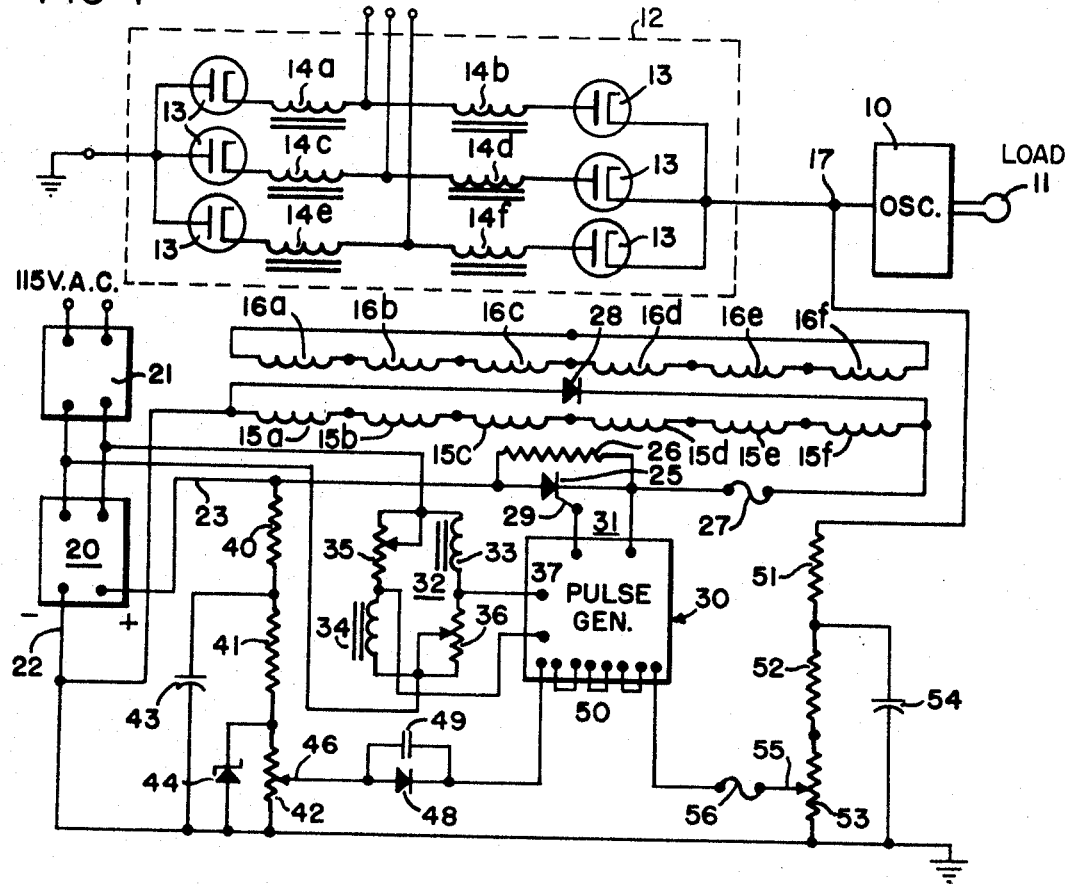
FIG. 1 is a schematic diagram showing a preferred embodiment of the control circuit of this invention used in conjunction with a saturable core reactor in the power supply circuit which supplies the input voltage to the radio frequency oscillator.

Referring to the drawings, and particularly to FIG. 1, which illustrates one embodiment of the control circuit constructed according to this invention, an oscillator 10 supplies a high power radio frequency current to the load 11 such as the coil of an induction heating device of the type well known in the art. Power to the oscillator is derived from a three-phase power line through a power supply 12 including rectifiers and saturable core reactors. The power supply consists of diode rectifiers 13 in series with the primary windings of a set of saturable core reactors 14a through 14f. The reactance of these reactors may be varied by varying the direct current through the control windings 15a through 15f. In addition, these saturable core reactors have self-saturating bias windings 16a through 16f which are connected in series in a closed loop.

The control windings 15a through 15f are connected in series and derive their power from a bridge rectifier 20 connected to the output of a constant voltage transformer 21. The negative side of the rectifier is connected through line 22 to the control winding 15a while the positive line 23 is connected to the control winding 15f through a silicon controlled rectifier 25. A shunt resistor 26 is connected across the rectifier 25 to provide protection from high transient signals that might otherwise cause damage to the rectifier. As further protection, a fuse 27 limits the current which can flow through the control windings and the silicon controlled rectifier. When the silicon controlled rectifier 25 is turned on, current may then flow through the control winding and cause the reactance of the primary winding to decrease, with the result that the voltage output of the power supply 12 of the oscillator 10 can be made to increase.

A diode 28 is placed in parallel with all of the control windings 15a through 15f in order that the silicon controlled rectifier 25 can be turned off after each pulse. This diode is commonly referred to as a back-diode or a free wheeling diode and is used to dissipate the energy stored in the windings of the inductive circuit load into which the silicon controlled rectifier works.

The silicon controlled rectifier may be turned on by a signal from pulse generator 30 to the gate rectifier 29. An alternating current input to the pulse generator 30 is supplied by the constant voltage transformer 21 through a phase shift network 32 which includes parallel chokes 33, 34 and potentiometers 35, 36. The amount of the phase shift of this network may be controlled by adjusting the potentiometers 35 and 36. The phase shift network was included in this embodiment in order to maintain the phase relation between the output voltage of rectifier bridge 12 and the output of the pulse generator 30 since a phase shift normally occurs in the constant voltage transformer 21. Therefore, the phase shift network 32 may be adjusted to cause a lag in the phase of the voltage applied to the pulse generator 30 to cause that voltage to be in phase with the pulsating direct current voltage from rectifier 20. In certain other applications, the phase shift network 32 may be eliminated.

A reference voltage for the pulse generator 30 is provided through a divider network which consists of resistors 40 and 41 and potentiometer 42. A filter capacitor 43 is connected between the junction of resistors 40 and 41 to ground. A Zener diode 44 is connected between the junction of resistor 41 and potentiometer 42 to ground to provide a stable constant voltage reference source. The wiper arm 46 of the potentiometer 42 can then be adjusted to pick off an accurately maintained direct current voltage which is applied to one side of the control winding to the pulse generator through the diode 48 which insures that the current through the control winding 50 of the pulse generator will flow in one direction only. A ripple filter 49 is placed in parallel with the diode 48.

A feedback signal to the other side of the control winding 50 in the pulse generator 30 is derived by a voltage divider network connected to the output 17 of the power supply 12 including resistors 51 and 52 and potentiometer 53. A filter capacitor 54 acts to suppress transient voltages which may occur. The adjustable tap 55 on potentiometer 53 is connected through a fuse 56 to the other side of the control winding 50 in the pulse generator. The difference between the feedback voltage and the reference voltage is therefore the control voltage which is applied across the control winding 50.

Figure 2:
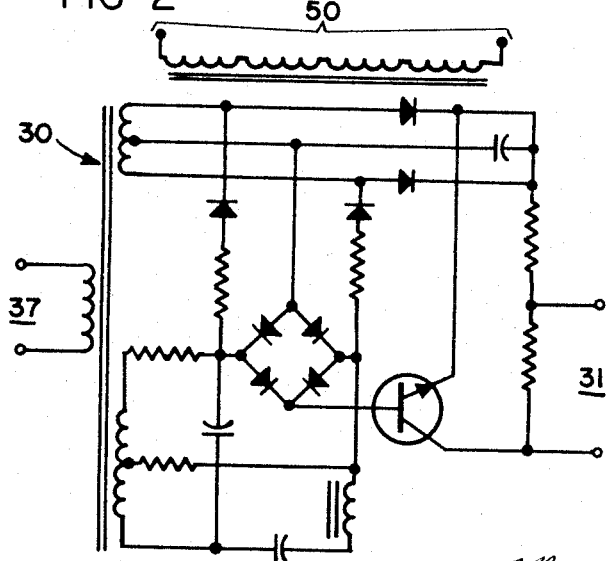
FIG. 2 is a schematic diagram showing the pulse generator used in this application.

The pulse generator circuit 30 is shown in FIG. 2 and is of the type commercially available from the VecTrol Engineering Division of Sprague Electric Company, and sold under the tradename "Silocontrol." The output of the pulse generator is controlled by a saturable core reactor having a control winding 50. The output of the pulse generator is in the form of a train of pulses which are timed in relation to the alternating current input 37, and the width of the pulses is determined by the magnitude of the direct current voltage across the control winding 50 of the saturable reactor. As the current through the control winding 50 increases due to an increase in the difference in voltage between potentiometer taps 46 and 55, the width of the pulse at the output 30 of the pulse generator will also increase, causing the direct current through the control windings 15a through 15f of the saturable core reactors to also increase. The impedance of these reactors is thereby effectively reduced and allows more voltage to appear at the output 17 of the power supply 12. This increase in voltage at 17 will cause a corresponding increase in voltage at potentiometer tap 55 thereby reducing the voltage difference between tap 55 and the reference voltage appearing at tap 46. The output of the power supply 12 can be thus maintained within close tolerances due to the action of the pulse generator and the corresponding control of current through the control windings 15a through 15f of the saturable reactors. The actual voltage appearing at the output terminal 17 can be controlled within predetermined limits by the setting of potentiometer tap 55 with respect to the reference voltage on potentiometer tap 46.

Figure 3:
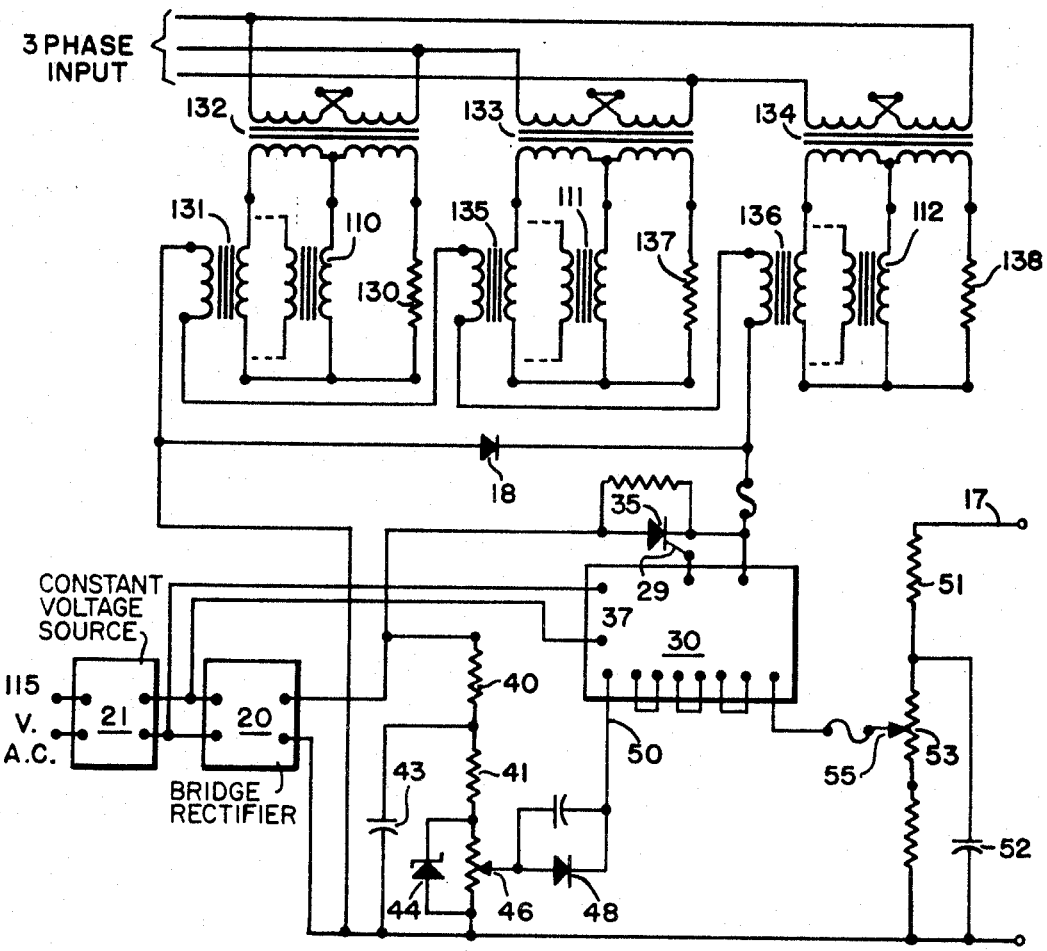
FIG. 3 is a schematic diagram showing another embodiment of a control circuit wherein the phase angle at which a set of thyratrons begin to conduct can be controlled to maintain constant the output voltage of a power supply.

FIGS. 3 and 4 show another embodiment of this invention wherein like reference numerals refer to like elements. In this embodiment, the pulse generator responds to an error or control voltage, that is, the voltage difference between a predetermined reference and a voltage which is proportional to the output voltage of a power supply, and applies a series of pulses to the gate electrode of a silicon controlled rectifier. This rectifier in turn controls the current passing through a saturable core reactor which determines the phase angle of the grid voltage on the thyratrons and consequently the duration during which the thyratron type rectifiers conduct. The power output from such a power supply can thereby be varied over a wide range as determined by the duration of conduction of the thyratrons.

As shown in FIG. 4, the output 17 of the rectifier circuit 70 is obtained from the center tap connections of the secondary windings 72a, 72b and 72c of transformer 73. A bleeder resistor 74 and a filter capacitor 78 are connected between the output line 17 and ground. These secondary windings supply power to the filaments of thyratron rectifiers 75, 76 and 77. The primary winding 79 of this transformer is connected to a suitable alternating current source, such as 220 volts. A three phase transformer 80 has a set of primary windings 81, 82 and 83 connected to a three phase alternating current source. One terminal of each of the secondary windings 85, 86 and 87 are connected in common while the other terminal of each of these windings is connected to the respective plate or anode of the thyratrons 75, 76 and 77.

Filament windings 88a, 88b and 88c supply filament power to rectifiers 90, 91 and 92. The plates of each of these rectifiers are connected to ground. The center tap of transformer 88a is connected to the transformer winding 85 in common with the anode of thyratron 75. In like manner, the center taps of secondary windings 88b and 88c are also connected to one side of the secondary windings 86 and 87 of transformer 80. Thus, rectifiers 90, 91 and 92 provide a ground return path for the power supply.

A bias power supply for the grids of the thyratrons is obtained by connecting the primary winding 95 of transformer 96 across the secondary winding 72a of transformer 73. The secondary or high voltage winding 97 provides an output which is converted to direct current by bridge rectifier 100. The output of this rectifier is placed across a resistor 103 and a filter capacitor 104 smooths the pulsating direct current ripple. The positive terminal of this rectifier is also connected through line 105 to the high voltage output terminal of the power supply. The adjustable tap 107 of potentiometer 103 is connected to the grid of each of the thyratrons 75, 76 and 77 through the secondary winding of transformers 110, 111 and 112 and resistors 113, 114 and 115. Suitable bypass capacitors 116 connect and maintain the grids of the thyratrons at radio frequency ground potential.

The output power of the power supply can be controlled by varying the time at which the thyratrons begin conduction. In order to control the point at which the thyratrons fire, the circuit shown in FIG. 3 is used. This circuit controls the voltage pulse which is applied to the thyratron to cause conduction. This can be done by varying the phase of the voltage applied to the thyratron grids by varying the reactance of one of the elements in series with the primary windings of transformers 110, 111 and 112.

Figure 5:
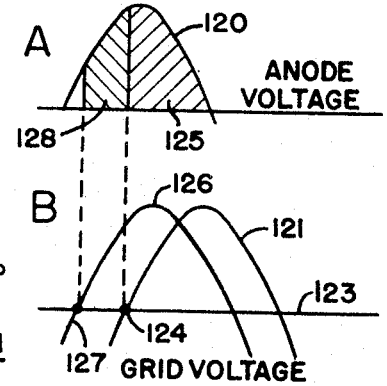
FIG. 5a is a curve representing the voltage on the anode of one of the thyratrons shown in FIG. 4.
FIG. 5b is a curve representing the voltage applied to the grid of one of the thyratrons shown in FIG. 4.

As shown graphically in FIGS. 5a and 5b, the power output of the thyratron rectifier can be made to vary merely by varying the phase angle of the grid voltage which initiates conduction without the need for changing the magnitude of the grid voltage. In FIG. 5a the voltage applied to the plate or anode of thyratron 75 is represented by the curve 120. The voltage which is applied to the grid of thyratron 75 is represented by the curve 121 in FIG. 5b. The line 123 represents the voltage level at which the thyratron conduction will occur. This level may be adjusted by changing the position of tap 107. When the grid voltage rises to the firing level, as at 124, the thyratron will begin conduction and will have a power output which can be represented by the area 125. Merely varying the phase angle of the grid voltage with respect to the plate voltage can change the power output of the thyratron. For example, decreasing the phase shift between the grid voltage and the plate voltage as shown by curve 126 will increase the power output of the thyratron since the grid voltage reaches the firing level 127 sooner than the voltage of curve 121. This causes the output power to be increased by an amount equal to the additional area under curve 120 which is defined by the reference numeral 128. In like manner, shifting the phase of the grid current to the right, or causing it to lag the applied plate voltage, can cause a decrease in the power output of the thyratron power supply.

As is well known, by varying the ratio of resistance to inductive reactance in a series circuit, the phase relation between the current in the circuit and the voltage applied to that circuit can be made to vary in accordance with the value of the inductive reactance. Using this principle, a circuit has been designed which can be made to vary the phase relation between the voltage applied to the plates of the thyratrons 75, 76 and 77 and the voltage applied to the grids of these thyratrons. The secondary transformer 110 supplies the alternating current voltage which is used to trigger thyratron 75. The primary of this transformer, as shown in FIG. 3, is in a circuit which includes a resistor 130, saturable reactor 131, and the secondary winding of transformer 132. The primary winding of transformer 132 is connected to a three phase alternating current power source.

The impedance of reactor 131 can be controlled by the value or magnitude of a direct current voltage applied thereto. Since the impedance of this element can be remotely changed, it follows that the phase relation between the current and the circuit and the voltage applied to the circuit can also be controlled. In this embodiment of the invention, a direct current voltage is applied to the control windings of the saturable reactor in each of the circuits which supply voltage to the grids of the thyratrons in power supply 70.

The primary windings of each of transformers 132, 133 and 134 are connected to a source of three phase alternating current. The secondary windings of each of these transformers is in a circuit which includes the secondary winding of saturable core reactors 131, 135 and 136, and resistors 130, 137 and 138, respectively. The primary windings of transformers 110, 111 and 112 are connected to the center tap of the power transformer and to the junction between the resistor and the saturable core reactor. The control windings of the saturable core reactors are connected in series and to a voltage control circuit similar to that shown and described with reference to FIG. 1.

A source of alternating current is supplied to constant voltage transformer 21. The output of this transformer is applied to the input 37 of pulse generator 30 and also to the bridge rectifier 20. A voltage divider network including resistors 40, 41 and potentiometer 42 is applied across the output in the rectifier 20. A filter capacitor 43 aids in smoothing any direct current ripple while a Zener diode 44 provides a constant voltage reference. A tap 46 of potentiometer 42 is adjusted to provide a reference voltage to one side of the pulse generator control winding 50. A diode 48 between the source of reference voltage in the control winding assures that current flows in only one direction.

A voltage divider network including resistors 51, 52 and potentiometer 53 is connected to the output terminal 17 of the thyratron power supply, shown in FIG. 4.

The tap 55 of potentiometer 53 is connected to the other half of the control winding 50 of the pulse generator and it is adjusted so that the voltage at tap 55 equals the voltage on tap 46 when the voltage output of the thyratron rectifier is at the desired level. Should the voltage at terminal 17 decrease, there will be a corresponding decrease in voltage at terminal 55 which will create a control voltage across the control winding 50. This will cause the pulse generator to supply a series of pulses from its output 31 to the gate electrode 29 of the silicon controlled diode 25. As previously explained, increasing the width of the pulses applied to the gate will cause the silicon controlled rectifier to conduct for longer periods of time, and consequently, more current will flow through the control windings of saturable core reactors 131, 135 and 136. In order to allow the silicon controlled rectifier to extinguish in view of its inductive load, a free wheeling diode 18 is placed across the output of the control circuit.

With current flowing through the control windings of these saturable core reactors, the effective impedance of these saturable core reactors, the effective impedance of these reactors is altered and causes a corresponding change in the phase angle of the current in the primary windings of transformers 110, 111 and 112 with respect to the voltage applied thereto. This change in phase is in a direction which causes the thyratrons to start conduction sooner and thus increases the power output of the rectifier circuit 70.

With either of the systems described above, a change in the power supply output voltage will be immediately corrected and will allow the power output of the oscillator circuit which supplies a high frequency current to induction heating coil to be maintained at a constant level regardless of variations of the input line voltage.

Figure 6:
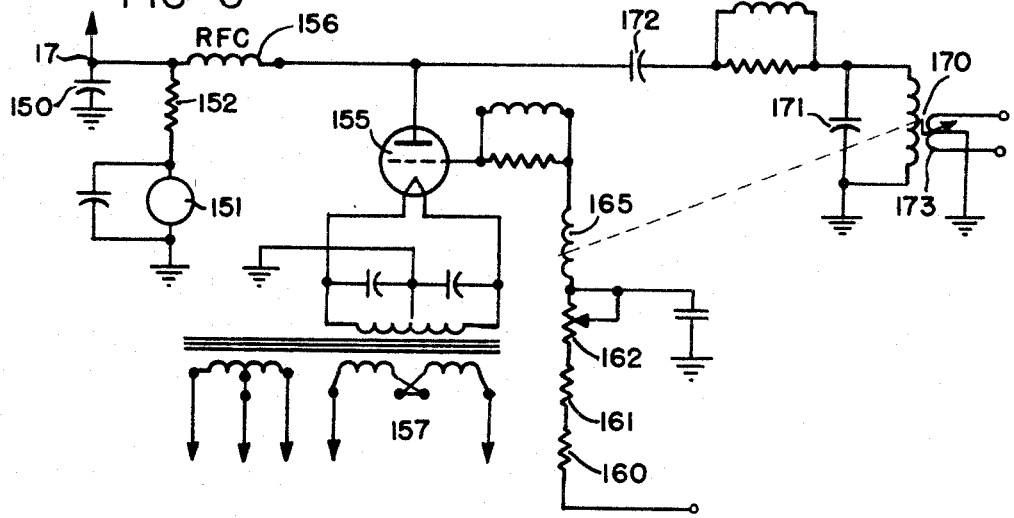
FIG. 6 is a schematic diagram showing a typical radio frequency oscillator of the type used to supply power to an induction heating coil.

FIG. 6 shows a typical high power radio frequency oscillator of the type used in providing power to an induction heating coil. The high tension direct current voltage to the oscillator circuit is applied at terminal 17. A capacitor 150 aids in maintaining terminal 17 at an effective radio frequency ground level although it is at a direct current voltage level of about 15,000 volts. A suitably bypassed meter 151 in series with resistor 152 allows the plate voltage of the oscillator to be monitored. The plate or anode of oscillator tube 155 is connected to the terminal 17 to a radio frequency choke 156. The power supply to the filament of oscillator tube 155 through a suitably bypassed output from transformer 157. Grid bias is applied through resistors 160, 161 and poteniometer 162, from a suitable voltage source. Inductance 165 in the grid circuit is coupled to the output coil 170 to supply the necessary feedback voltage to maintain tube 155 in oscillation.

Coil 170 and capacitor 171 form a tank circuit which is resonated to the desired frequency. This tank circuit is coupled to the plate of oscillator 155 through a coupling capacitor 172. A link 173 surrounds coil 172 and is connected to the induction coil 11 used in heating the metallic parts.

With the forms of apparatus thus described, the input voltage level to the high power radio frequency oscillator which supplies the power to an induction heating coil can be maintained at a substantially constant level even though a change in the input voltage to the oscillator power supply may vary over a considerably wide range.

While the forms of apparatus herein described constitute preferred embodiments of the invention, it is to be understood that the invention is not limited to these precise forms of apparatus, and that changes may be made therein without departing from the scope of the invention which is defined in the appended claim.

What is claimed is:

1. A power supply circuit for supplying a regulated output voltage to a load comprising:

a rectifier circuit connected to a source of alternating current for supplying a direct current voltage to the load, said rectifier circuit including, a thyratron rectifier for converting alternating current to direct current, a saturable core reactor having a control winding and a primary winding operably connected to said thyratron rectifier, a phase shift circuit including a resistor and the primary winding of said saturable core reactor; and a transformer having a primary winding connected in said phase shift network and a secondary winding connected to the grid of said thyratron rectifier;

the output voltage of said rectifier circuit being controlled by the impedance of said primary winding;

a silicon controlled rectifier connected in series with the control winding of said saturable core reactor;

means for producing a reference voltage;

means connected to the output of said rectifier circuit and to said reference voltage means for providing a control voltage which is proportional to the difference in the output voltage of said rectifier circuit and said reference voltage; and a pulse generator having its output connected to the control electrode of said silicon controlled rectifier and having an output pulse width adjustably determined by the magnitude of a control voltage applied thereto whereby current flows through said control winding during the time the output pulse is applied to said control electrode;

said control voltage being applied to the control input of said pulse generator whereby a change in the output voltage of said rectifier circuit from a predetermined value will cause the pulse width of said pulse generator to vary thereby to change the average current flow through said control winding of said saturable core reactor and thereby change the impedance of said primary winding of said saturable core reactor, said impedance change varying the phase angle of the voltage applied to the grid of said thyratron rectifier to vary the duration of conduction of said thyratron rectifier such that the voltage output from said rectifier circuit is maintained at a constant value.

References Cited

UNITED STATES PATENTS

| | | | |
|---|---|---|---|
| 2,856,498 | 10/1958 | Jones | 219—10.77 X |
| 3,122,699 | 2/1964 | Schohan | 323—83 |
| 2,961,594 | 11/1960 | Mah | 321—25 X |
| 3,013,199 | 12/1961 | Hollingsworth et al. | 321—25 X |
| 3,137,810 | 6/1964 | Foote | 321—25 X |
| 3,200,328 | 8/1965 | Green | 321—25 X |
| 3,270,270 | 8/1966 | Yenisey | 321—18 |
| 3,287,625 | 11/1966 | Malatier et al. | 323—89 |
| 3,358,210 | 12/1967 | Grossoehme | 321—25 X |

JOHN F. COUCH, *Primary Examiner.*

G. GOLDBERG, *Assistant Examiner.*

U.S. Cl. X.R.

321—25; 323—22, 34, 89

PO-1050
(5/69)

UNITED STATES PATENT OFFICE
CERTIFICATE OF CORRECTION

Patent No. 3,432,739      Dated March 11, 1969

Inventor(s) Harry D. Kauffman

It is certified that error appears in the above-identified patent and that said Letters Patent are hereby corrected as shown below:

Column 1, lines 4 and 5, "The Ohio Crankshaft Co."
should read -- Park-Ohio Industries, Inc. --.

Column 6, line 22, should be deleted.

SIGNED AND
SEALED
FEB 3 1970

(SEAL)
Attest:

Edward M. Fletcher, Jr.
Attesting Officer

WILLIAM E. SCHUYLER, JR.
Commissioner of Patents